United States Patent [19]
Nagano

[11] Patent Number: 5,194,051
[45] Date of Patent: Mar. 16, 1993

[54] SPROCKET WHEEL MOUNTING UNIT FOR A BICYCLE

[75] Inventor: Masashi Nagano, Izumi, Japan
[73] Assignee: Shimano, Inc., Osaka, Japan
[21] Appl. No.: 854,865
[22] Filed: Mar. 20, 1992
[30] Foreign Application Priority Data
  Mar. 27, 1991 [JP] Japan .................... 3-062286
[51] Int. Cl.⁵ ............................................. F16H 9/06
[52] U.S. Cl. ................................................. 474/160
[58] Field of Search ............... 474/152, 160, 164, 165, 474/47, 69, 70

[56] References Cited
U.S. PATENT DOCUMENTS
  4,047,603  9/1977  Ozaki ..................... 474/160 X
  4,324,323  4/1982  Campagnolo ............ 474/160 X

*Primary Examiner*—Thuy M. Bui
*Attorney, Agent, or Firm*—Dickstein, Shapiro & Morin

[57] ABSTRACT

A multistep sprocket wheel unit having a plurality of sprocket wheels in ring form; a boss having an axis, a front end face and a rear end face; and a plurality of support arms extending radially outwardly from outer peripheries of the boss and inclined toward the rear end face with respect to the axis. The support arms are arranged around the boss, and each defines a plurality of stepped surfaces formed on an inclined portion thereof opposed to the front end face. The stepped surfaces include vertical surfaces perpendicular to the axis and horizontal surfaces parallel to the axis. Adjacent ones of the vertical surfaces are formed with a predetermined pitch for use as sprocket wheel positioning surfaces. Where the vertical surfaces are formed with a pitch corresponding to a mounting pitch of the sprocket wheels, the sprocket wheels may simply be placed with side surfaces thereof contacting and fixed to the positioning surfaces to obtain an accurate mounting pitch.

8 Claims, 4 Drawing Sheets

SPROCKET WHEEL MOUNTING UNIT FOR A BICYCLE

BACKGROUND OF THE INVENTION

1. Field of the Invention

The present invention relates to a sprocket wheel mounting unit for supporting a plurality of sprocket wheels of a bicycle, particularly for use with a rear wheel of the bicycle.

2. Description of the Prior Art

With an increased number of speeds provided by a derailleur of a bicycle today, a multistep sprocket wheel unit for the rear wheel includes an increased number of sprockets which is now 5 to 7. There are demands for a simplified mounting structure and easy mounting method. To meet such requirements, the multistep sprocket wheel unit for the rear wheel disclosed in Japanese Utility Model Publication Kokai No. 63-4893, for example, has a plurality of sprocket wheels in the form of ring plates arranged in order on a cylindrical boss with spacers in between. Each sprocket wheel is connected to an associated spacer by means of screws or the like. Splines are formed between the sprocket wheels and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

In this multistep sprocket wheel unit, the teeth of the largest sprocket wheel are at a considerable distance to the boss, and this sprocket wheel needs sufficient thickness to avoid deformation at torque transmitting times. This results in an increased weight. If the boss is formed to have a large outside diameter in order to reduce the radial length of sprocket itself, the boss must have an increased thickness since the rear wheel axle has a standardized size, which again results in an increased weight.

Further, for using spacers to adjust mounting pitches of the sprocket wheels, a plurality of spacers must be manufactured with high precision. Assembly work also becomes troublesome with an increase in the number of sprocket wheels.

SUMMARY OF THE INVENTION

The object of the present invention is to provide a sprocket wheel mounting unit having a plurality of sprocket wheels in ring form for a bicycle, particularly for the rear wheel of the bicycle, which may be assembled with ease and may be lightweight.

The above object is fulfilled, according to the present invention, by a multistep sprocket wheel mounting unit comprising:

a boss having an axis, a front end face and a rear end face;

a plurality of support arms extending radially outwardly from outer peripheries of the boss and inclined toward the rear end face with respect to the axis, the support arms being arranged around the boss; and a plurality of stepped surfaces formed on an inclined portion of each of the support arms opposed to the front end face, the stepped surfaces including vertical surfaces substantially perpendicular to the axis and horizontal surfaces substantially parallel to the axis;

adjacent ones of the vertical surfaces being formed with a predetermined pitch for use as sprocket wheel positioning surfaces.

Preferably, the inclined portion of each of the support arms opposed to the front end face and an inclined portion of each of the support arms opposed to the rear end face are substantially parallel to each other, a space being formed between the inclined portion opposed to the rear end face and the boss.

With the multistep sprocket wheel unit having the above construction, where the vertical surfaces are formed with a pitch corresponding to a mounting pitch of the sprocket wheels, the sprocket wheels may simply be placed with side surfaces thereof contacting and fixed to the positioning surfaces to obtain an accurate mounting pitch. Since the vertical surfaces are formed stepwise on each of the inclined support arms, even a large sprocket wheel has a reduced radial length from its teeth to the inner periphery of the ring. As a result, an increase in the thickness of the sprocket wheels may be checked. The plurality of inclined support arms are connected to the plurality of sprocket wheels to form a connected structural body having excellent strength. It is therefore unnecessary for this structural body to have an increased size, particularly an increased thickness. This enables each support arm to be shaped to form a triangular space in side view between the inclined portion thereof opposed to the rear end face and the boss. Such configuration contributes greatly toward a weight reduction of the unit.

Other features and advantages of the present invention will be apparent from the following description of the preferred embodiment to be had with reference to the drawings.

DETAILED DESCRIPTION OF THE PREFERRED EMBODIMENT

Figure 1:
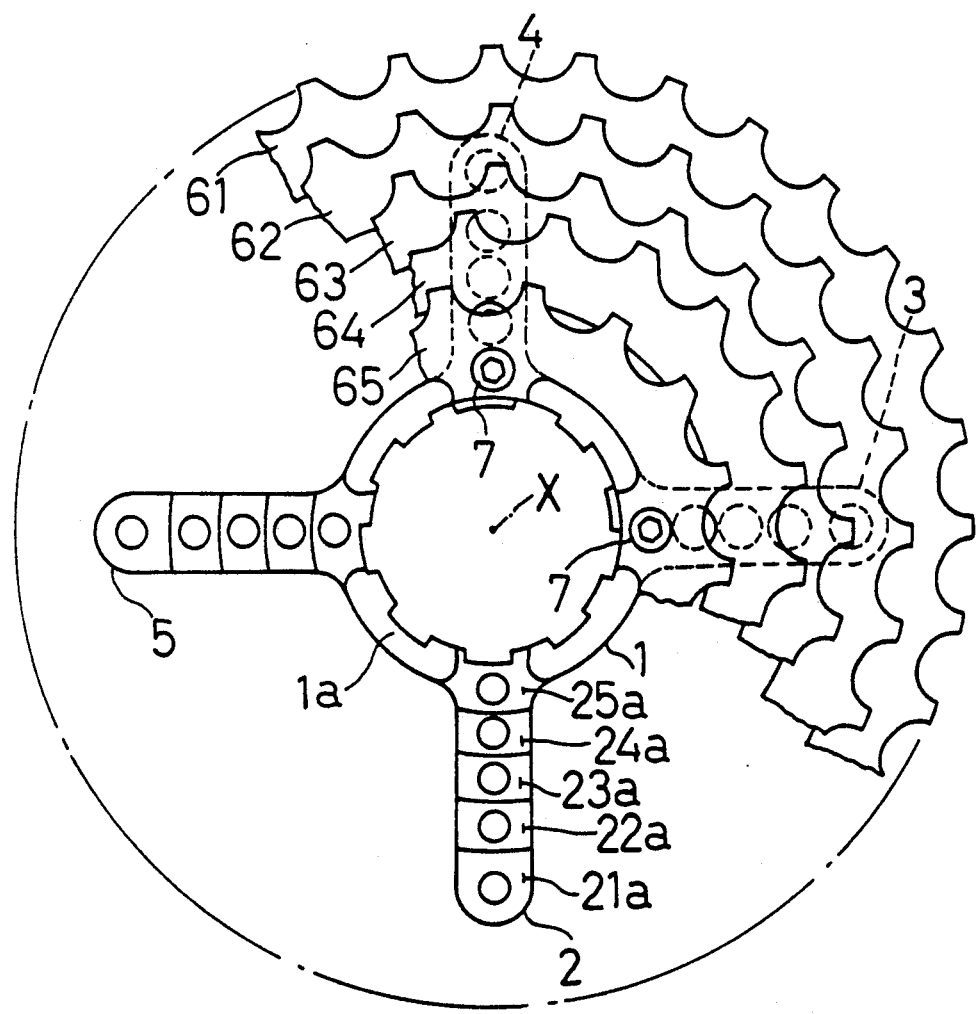
FIG. 1 is a front view, partly broken away, of a multistep sprocket wheel unit according to the present invention as seen axially thereof.
Figure 2:
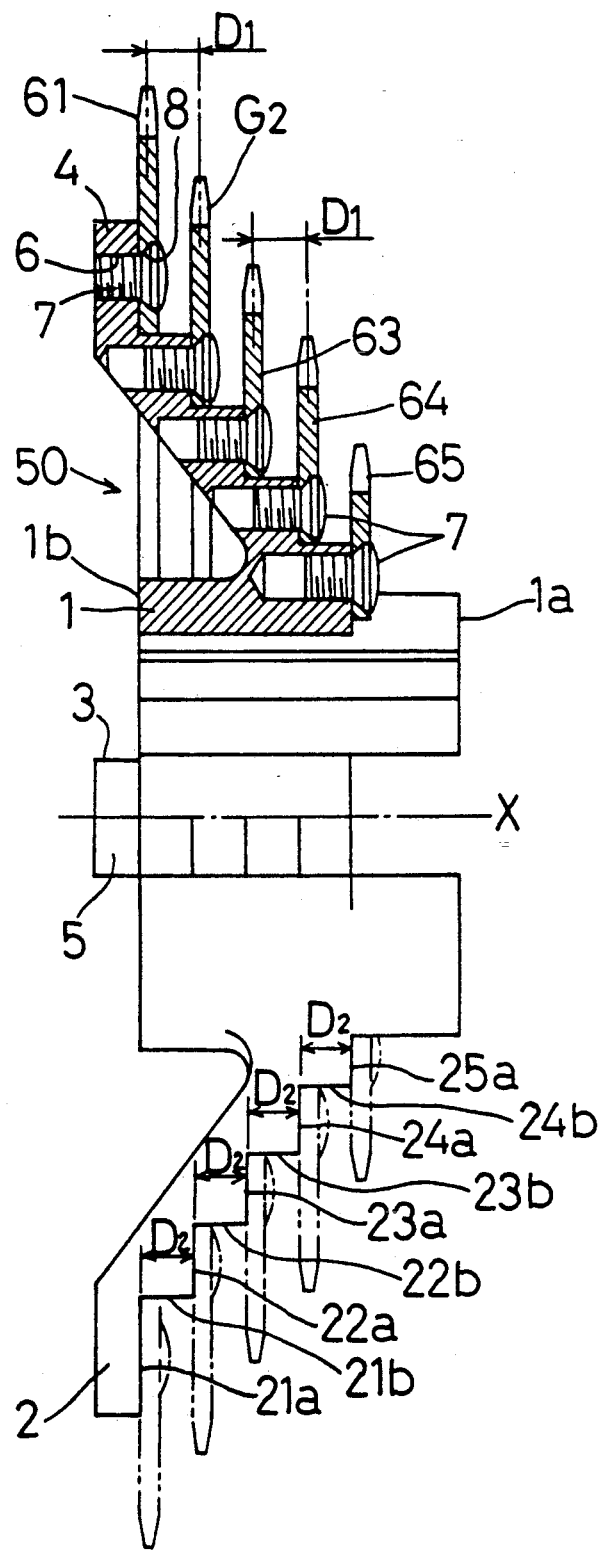
FIG. 2 is a side view, partly broken away, of the multistep sprocket wheel unit of FIG. 1 as seen radially thereof.
Figure 3:
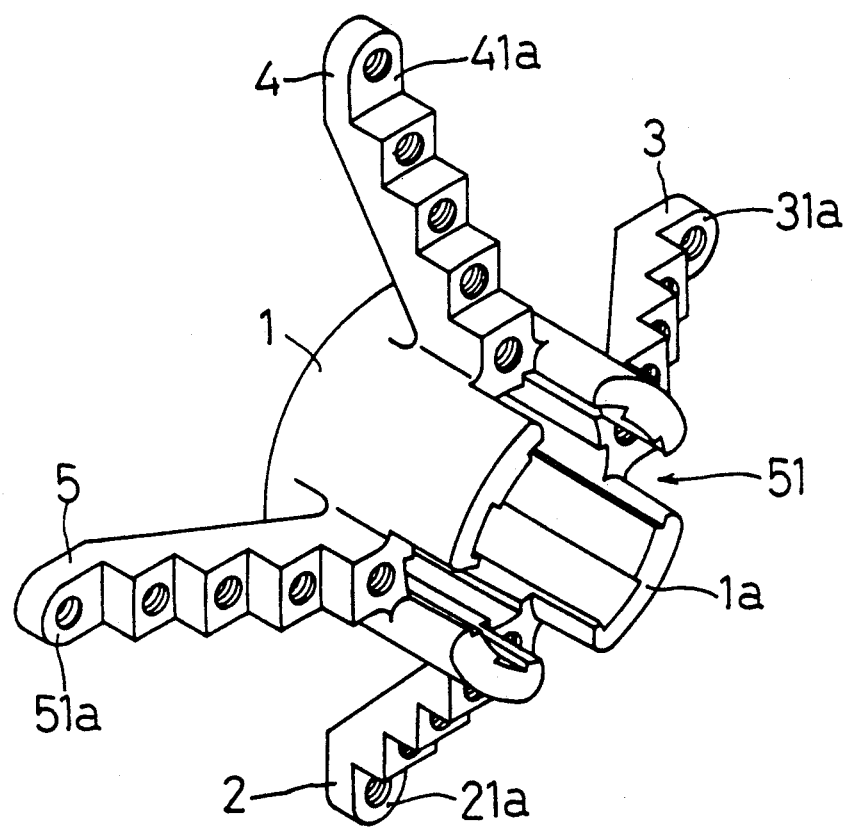
FIG. 3 is a perspective view of the multistep sprocket wheel unit of FIG. 1 with a sprocket wheel removed therefrom.

FIGS. 1 through 3 show multistep sprocket wheel unit embodying the present invention. This unit, basically, includes a boss 1 having a front surface 1a and a rear surface 1b extending perpendicular to an axis X thereof, four support arms 2-5 extending radially outwardly from outer peripheries of the boss 1 and inclined toward the rear end face 1b with respect to the axis X, and a plurality of, 5 in this embodiment, sprocket wheels 61-64 in the form of ring plates arranged on the support arms 2-5 with a predetermined mounting pitch: D1 axially of the boss 1. The boss 1 has a one-way transmission mechanism, which will be described later, on an inner periphery thereof.

The support arms 2-5 are arranged equidistantly around the boss 1, and extend with a substantially constant width and thickness. Each of the support arms 2-5 defines a plurality of stepped surfaces 21a, 21b-25a; 31a, 31b-35a; 41a, 41b-45a; or 51a, 51b-55a including vertical surfaces perpendicular to the axis X and horizontal surfaces parallel to the axis X. For example, the support arm 2 has, formed successively from an upper end thereof, a vertical surface 21a, a horizontal surface 21b, a vertical surface 22a, a horizontal surface 22b, a vertical surface 23a, a horizontal surface 23b, a vertical surface 24a, a horizontal surface 24b and a vertical surface 25a. The other support arms 3-5 have similar vertical surfaces and horizontal surfaces though not affixed with reference numerals in the drawings.

Adjacent vertical surfaces are formed with an axial pitch: D2 corresponding to the mounting pitch: D1 of the sprocket wheels 61-64. Thus, the respective vertical surfaces are used for setting mounting positions of the associated sprocket wheels 61-64. The respective horizontal surfaces are at distances to the axis X which correspond to inside diameters of the sprocket wheels 61-64 in ring form mounted thereon. These distances are determined so that the vertical surfaces and horizontal surfaces form substantially uniform steps.

Each vertical surface includes a threaded bore 6 extending parallel to the axis X. The sprocket wheels 61-64 are placed in contact with the corresponding vertical surfaces and fixed tight by screws 7. For this purpose, the sprocket wheels 61-64 define countersinks 8. Instead of fastening the sprocket wheels 61-64 with the threaded bores 6 and screws 7, the sprocket wheels 61-64 may be fastened to the support arms 2-5 with bolts and nuts, with the support arms 2-5 defining perforations.

All the support arms 2-5 and sprocket wheels 61-64 fastened together constitute a connected structural body having a stable strength. As seen from FIG. 2, the shape of each support arm may be selected such that a triangular cutout space 50 is formed in side view between an inclined surface of the support arm adjacent the rear end 1b and the outer periphery of the boss 1. This configuration is particularly effective for weight reduction.

As best seen from FIG. 3, the lowermost vertical surfaces 25a extend into the boss 1, and the boss 1 has cutouts 51 for this purpose. There are no horizontal surfaces corresponding to these vertical surfaces 25a. This construction allows the sprocket wheels 61-64 to be mounted very close to the outer periphery of the boss 1.

The support arms 2-5 and boss 1 may be manufactured integrally by die casting, to obtain the axial pitch of the vertical surfaces simply and accurately.

The boss 1 is mounted on the rear axle of a bicycle through a one-way transmission mechanism. A mounting structure therefor will be described hereinafter.

Figure 4:
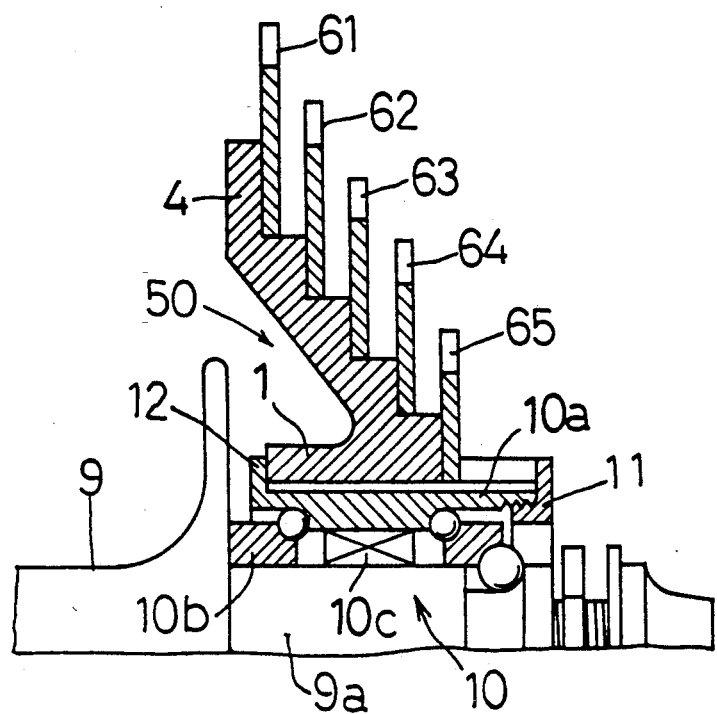
FIG. 4 is a sectional view of the multistep sprocket wheel unit with a boss thereof mounted on a rear wheel of a bicycle through a one-way transmission mechanism.

In FIG. 4, a one-way transmission mechanism 10 is mounted on a shaft portion 9a formed at one end of a rear wheel hub unit 9 forming the rear axle. This one-way transmission mechanism 10 includes an outer race 10a, an inner race 10b, and a one-way clutch 10c disposed between the shaft portion 9a and outer race 10a. Bearing balls are mounted between the outer race 10a and inner race 10b for smoothing rotation. The outer race 10a has splines formed on an outer periphery thereof for engaging similar splines formed on the boss 1. Numeral 11 denotes a tightening ring which, in combination with a radial projection of the outer race 10a, fixes the boss 1 to the outer race 10a, and hence to the rear wheel hub unit 9.

Figure 5:
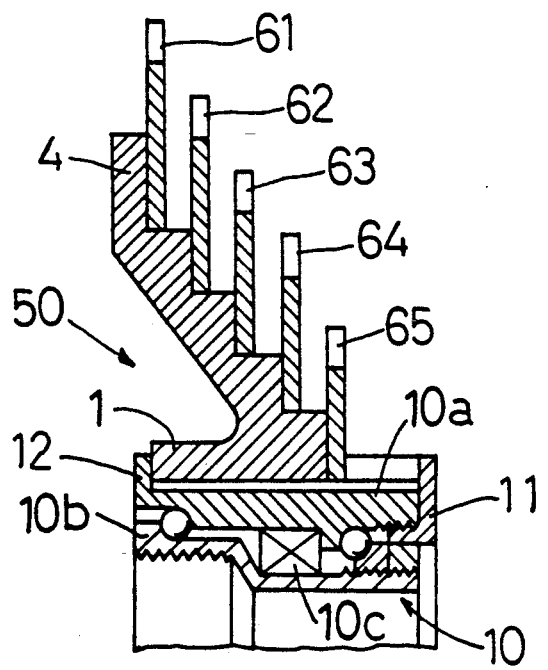
FIG. 5 is a view similar to FIG. 4 and showing a modified structure in which the multistep sprocket wheel unit with the boss thereof mounted on a rear wheel of a bicycle through the one-way transmission mechanism.

FIG. 5 shows a modified mounting structure in which a one-way transmission mechanism 10 includes an inner race 10b screwed to a rear wheel hub unit.

It is within the scope of the present invention to provide four or six or more sprocket wheels, to place a plurality of sprocket wheels against one vertical surface of each support arm, and to provide support arms each having a cross section enlarging toward the lower end thereof. The boss may be formed as the outer race of the one-way transmission mechanism to contribute toward compactness of the mounting unit.

What is claimed is:

1. A sprocket wheel mounting unit for supporting a plurality of sprocket wheels in ring form for use on a bicycle, particularly on a rear wheel of a bicycle, comprising:
    a boss having an axis, a front end face and a rear end face;
    a plurality of support arms extending radially outwardly from outer peripheries of said boss and inclined toward said rear end face with respect to said axis, said support arms being arranged around said boss; and
    a plurality of stepped surfaces formed on an inclined portion of each of said support arms opposed to said front end face, said stepped surfaces including vertical surfaces substantially perpendicular to said axis and horizontal surfaces substantially parallel to said axis;
    adjacent ones of said vertical surfaces being formed with a predetermined pitch for use as sprocket wheel positioning surfaces;
    said inclined portion of each of said support arms opposed to said front end face and an inclined portion of each of said support arms opposed to said rear end face being substantially parallel to each other, a space being formed between said inclined portion opposed to said rear end face and said boss.

2. A mounting unit as claimed in claim 1, wherein said vertical surfaces includes fixing means for fixing said sprocket wheels in place.

3. A mounting unit as claimed in claim 2, wherein said fixing means each includes a bore extending parallel to said axis from one of said vertical surfaces to said space.

4. A mounting unit as claimed in claim 2, wherein said fixing means each includes a threaded bore extending parallel to said axis from one of said vertical surfaces.

5. A mounting unit as claimed in claim 1, further comprising a one-way transmission mechanism disposed on an inner periphery of said boss.

6. A mounting unit as claimed in claim 5, wherein said one-way transmission mechanism includes an outer race, an inner race, and a one-way clutch interposed between said outer race and said inner race, said outer race and said boss being interconnected to be unrotatable relative to each other, said inner race being formed integral with a rear wheel axle unit.

7. A mounting unit as claimed in claim 5, wherein said one-way transmission mechanism includes an outer race, an inner race, and a one-way clutch interposed between said outer race and said inner race, said outer race and said boss being interconnected to be unrotatable relative to each other, said inner race being screwed to a rear wheel axle unit.

8. A mounting unit as claimed in claim 5, wherein said one-way transmission mechanism includes an outer race, an inner race, and a one-way clutch interposed between said outer race and said inner race, said outer race being formed on said boss.

* * * * *